(12) United States Patent
Shlyachtin

(10) Patent No.: US 7,820,032 B2
(45) Date of Patent: Oct. 26, 2010

(54) METHOD OF HYDROCARBON MATERIAL FRACTIONATION AND INSTALLATION FOR ITS IMPLEMENTATION

(76) Inventor: Nikolai Gennadievich Shlyachtin, ul. Bazhenova, 22a-20, Rybinsk, Yaroslavskaya obl., 152912 (RU)

( * ) Notice: Subject to any disclaimer, the term of this patent is extended or adjusted under 35 U.S.C. 154(b) by 506 days.

(21) Appl. No.: 11/914,270

(22) PCT Filed: Aug. 24, 2005

(86) PCT No.: PCT/RU2005/000431

§ 371 (c)(1),
(2), (4) Date: Nov. 13, 2007

(87) PCT Pub. No.: WO2006/126908

PCT Pub. Date: Nov. 30, 2006

(65) Prior Publication Data

US 2008/0156701 A1    Jul. 3, 2008

(30) Foreign Application Priority Data

May 24, 2005    (RU) ............................. 2005115548

(51) Int. Cl.
*C10G 51/04* (2006.01)
(52) U.S. Cl. .................. 208/76; 208/67; 208/113; 208/128; 208/126; 208/425; 201/19
(58) Field of Classification Search .......... None
See application file for complete search history.

(56) References Cited

U.S. PATENT DOCUMENTS

| 2,517,140 | A | * | 8/1950 | Smith ..................... 208/162 |
| 3,449,213 | A | * | 6/1969 | Knapp et al. ............... 201/19 |
| 4,077,870 | A | * | 3/1978 | Horowitz .................. 208/128 |
| 4,376,034 | A | * | 3/1983 | Wall ........................ 208/402 |
| 5,262,045 | A | * | 11/1993 | Rao et al. ................. 208/139 |
| 5,547,549 | A | * | 8/1996 | Fraas ....................... 202/99 |
| 2006/0116543 | A1 | * | 6/2006 | Bellet et al. ............... 585/648 |

\* cited by examiner

*Primary Examiner*—Tam M Nguyen
(74) *Attorney, Agent, or Firm*—Notaro, Michalos & Zaccaria P.C.

(57) ABSTRACT

The main distinctive feature of the method lies in the fact that the hydrocarbon material is affected through primary and principal excitation by means of electromagnetic vibrations. The primary influence upon the hydrocarbon material is carried out prior to its feeding for thermal cracking, while the, principal influence is fulfilled in the rectifying column. For the method to be implemented, the primary excitation source in the installation is realized in a form of an electromagnetic oscillator, and the rectifying column is realized with possibility of resonance excitation provided, being the main exciter of the hydrocarbon material. The invention makes it possible to increase the percentage of output of lighter fractions, as well as to raise the quality of processing of raw materials.

3 Claims, 1 Drawing Sheet

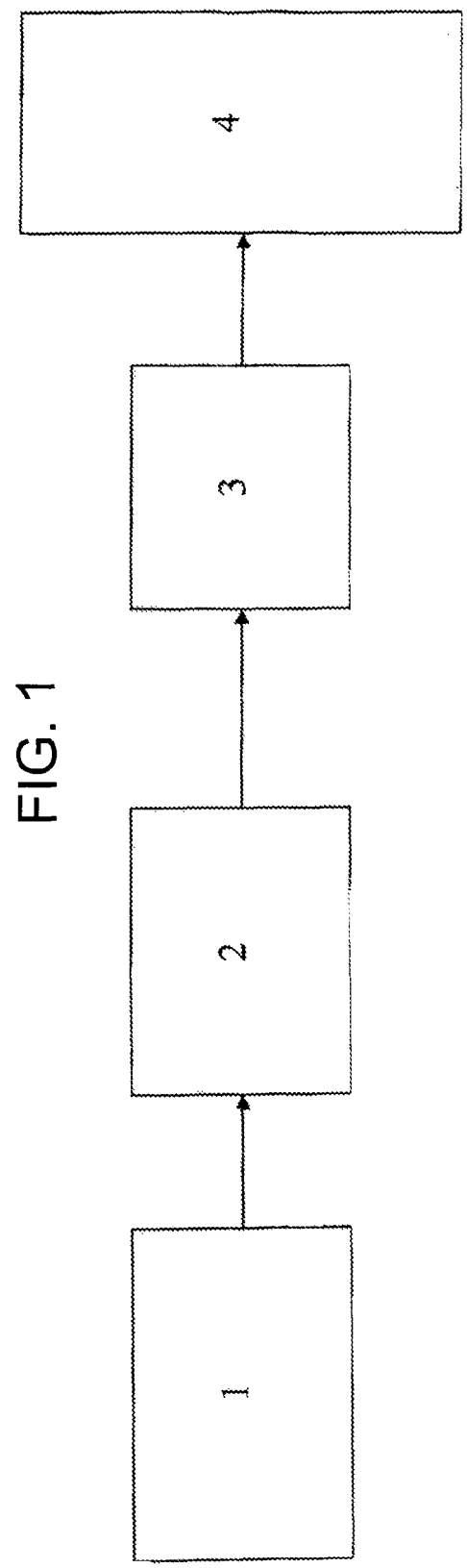

METHOD OF HYDROCARBON MATERIAL FRACTIONATION AND INSTALLATION FOR ITS IMPLEMENTATION

FIELD AND BACKGROUND OF THE INVENTION

The invention refers to a method of fractionation of hydrocarbon material (oil) and may be applied in installations with an atmospheric column, and those equipped with both an atmospheric and a vacuum column, intended for fractional distillation of oil.

Practical field of industrial application of the invention covers oil-processing, chemical and other industries related to processing of liquids containing bound hydrogen, primarily—hydrocarbon liquids, such as gas distillate, crude oil, intermediate and finished products of oil processing, etc.

Methods of acoustic excitation of liquids are well-known from state of the art. These methods comprise transfer of vibrational energy to a liquid by means of a source of mechanical vibrations interacting with the liquid, where the source in question may be presented by mechanical, electromechanical, magnetostrictive, piezoelectric, hydrodynamic and other types of acoustic radiators. In particular, patent RU 2149886 describes a method of resonant excitation of oil and other liquids containing bound hydrogen, by means of vibrating effect on a fluid aimed at destructive transformation of its chemical bonds on the molecular level.

All of these well-known methods of acoustic excitation of liquids for destructive transformation of their chemical bonds are characterized by a shortcoming, lying in the lack of definite criteria for selection of particular resonance frequencies, which may substantially reduce efficiency of acoustic pretreatment of liquids.

International publication WO 94/10261 also describes a method and a device for pretreatment and fractionation of hydrocarbon liquids by means of a hydrodynamic acoustic radiator of the rotor type. The method of pretreatment of liquids comprises consecutive supply of fluid into cavities of a number of impellers, release of liquid from the cavity of each of these impellers into the stator cavity through the impeller outlets and the stator bypass ports, the peripheral face of the impellers being separated from the stator by the smallest possible gap. The streams of liquid flowing out of the impeller outlets undergo periodic interruptions, which excite sound frequency mechanical vibrations in the liquid. The device for pretreatment of liquids comprises a rotor including a shaft supported by bearings and a number of impellers mounted on the shaft. Each of the impellers is made in the form of a disc with a peripheral circular wall, where a series of outlets for liquid are uniformly distributed along the circle. The device contains a is stator having an inlet and an outlet for liquid, as well as coaxial walls adjacent to the circular peripheral wall of each of the impellers with the smallest technologically feasible gap, a number of bypass holes for liquid made in each of the coaxial walls. A device for fractionation of hydrocarbon liquids is coupled with a device for their pretreatment and contains a chamber for separation of pretreated liquid into liquid and vapor phases (conjugated with the last impeller) and a communicating chamber for condensation of the vapor phase.

However, the above-described method and device for pretreatment of hydrocarbon liquids do not allow for such pretreatment potentiality to be realized to its full extent, which would make fractionation of the pretreated liquid more efficient.

International publication WO 96/33011 also describes a method and a device for conditioning of hydrocarbon liquids by means of a hydrodynamic source of mechanical vibrations. The method comprises supply of liquid into the cavity of an impeller rotating inside a stator, release of liquid from the cavity of the impeller through a series of outlets distributed uniformly along its peripheral face into a circular chamber confined with the peripheral face of the impeller and the internal coaxial surface of the stator, and liquid extraction from the circular chamber. Liquid is preferably extracted from the circular chamber into the stator collection chamber through a series of bypass holes distributed uniformly along the stator internal coaxial surface, which are located, one after another, against the outlets of the impeller, while the latter is rotating. Here the nominal value of radius R of the impeller peripheral face and its nominal rotation speed n are set depending on selected number K of its outlets, according to the following empirical relations:

$$R = 1.1614 \, K \text{ mm},$$

$$n = 3.8396 \, K^{-3/2} \cdot 10^6 \text{ rpm}.$$

The device contains a rotor, which comprises a shaft supported by bearings and at least one impeller mounted on the shaft. This impeller is made as a disc with a peripheral circular wall, where outlets are holes distributed uniformly along the circle. The stator has a wall coaxial to the impeller, an inlet for supply of liquid communicating to the impeller cavity and an outlet for liquid extraction. There is a circular chamber formed by the stator coaxial wall and the impeller peripheral circular wall, which communicates with the stator outlet. The stator preferably has a collection chamber communicating, on the one side, with its outlet, and on the other side, with the circular chamber, through a series of bypass holes made in the stator coaxial wall and distributed uniformly along the circle. Means for driving the rotor with a predetermined speed are provided.

The above-described method and device of conditioning hydrocarbon liquids have made an efficient effort to find the optimum relation between the determinative operating parameters such as the radius of the impeller peripheral face and the impeller rotation speed. However potentiality of such pretreatment of hydrocarbon liquids to optimize their fractionation efficiency is not exhausted yet.

A method of fractionation of hydrocarbon liquids by means of distillation is also known from state of the art, which implies pretreatment of a liquid to be fractionated according to the method described, e.g. in the above-mentioned international publication WO 96/33011, through supply of pretreated liquid into the rectifying column and extraction of the distillated and residual fractions.

Installations for fractionation of hydrocarbon liquids through distillation are also known from the state of the art, these installations comprising a feed pump connected by pipelines to at least one rectifying column. For instance, application of a primary rotor hydrodynamic device in such installations for pretreatment of the liquid to be fractionated is known from the above-mentioned international publication WO 96/33011.

Similar methods and installations for fractionation of hydrocarbon liquids through using a primary rotor hydrodynamic device for their pretreatment make it possible to increase output of the most valuable light ends. However, in practice, potentiality of such technology remains unrealized to its full extent. Among the reasons are both insufficient efficiency of the rotor hydrodynamic device for pretreatment of liquid, and not quite rational way of integrating this device into conventional schemes of installations for fractionation of hydrocarbon liquids.

A method of processing of oil-containing tailings according to RF patent No. 2215775 of Nov. 10, 2003 is also known from state of the art. This method implies supply of raw material into the processing zone, processing of the raw material by wave action produced through formation of a wide range of frequencies (from the acoustic to the light ones) in the medium to be processed with subsequent thermal cracking of the action products implemented in the mode of oil primary distillation and obtaining finished products from the vapor phase, and an installation for fractionation of hydrocarbon material, which comprises the following communicating units: a device for processing feed stock implemented as an operating container, a generator and radiator of acoustic vibrations, which comprise a generator and a radiator of acoustic vibrations and an additional generator of electromagnetic vibrations electrically connected to a radiating aerial located inside the operating container and made in the form of two radiating circuits arranged inside a cylinder housing, each of these circuits comprising a series of transversal parallel perforated metal plates fixed rigidly on the wall of the housing, where the circuits are made of metal with different electronegativity, and the plates of one of the circuits are located between the plates of the other circuit, and where the housing of the above-mentioned radiator is made of a dielectric material possessing a piezoelectric property, the device for extraction of finished products contains a cracking tank for processed products, which is connected to a refluxer-distiller, and accumulating containers for the finished product and residual products of cracking. The generator of electromagnetic vibrations may be realized as an electric spark arrester. The generator of acoustic vibrations is an electric centrifugal pump mounted on a pipeline at the inlet of the container, while the radiator of acoustic vibrations is represented by the pipeline supplying the material into the container and the walls of this container.

This solution has a shortcoming: the design of the generator of electromagnetic vibrations in the installation of hydrocarbon material fractionation is complicated, its parameters are to be selected depending on the quality of the material, selectivity of the effect produced by the device on the material to be processed is obtained by selection of materials the to aerial plates and the dielectric housing are made of. Therefore the design in question cannot be efficiently applied for processing materials of different quality, without undergoing reconstruction (which is laborious in itself) accomplished by experimental matching of separate units of processing equipment. Moreover, obligatory involvement of an electric pump in processing as a source of acoustic vibrations of the pipeline walls significantly reduces the effect produced upon the medium being processed.

SUMMARY OF THE INVENTION

The method and device of fractionation of hydrocarbon material described in the patent RU 2178337 of Jan. 20, 2002 are the ones most close to the engineering solutions being claimed.

The method of fractionation of hydrocarbon liquids through distillation implies pretreatment of liquid by means of a primary rotor hydrodynamic source of mechanical vibrations, supply of pretreated liquid into the rectifying column and extraction of the distilled and residual fractions. The liquid pretreatment is fulfilled through its resonant excitation by means of a source of mechanical vibrations interacting with the liquid. The liquid resonant excitation is realized at one of the following basic frequencies subject to the common relation $F_N = F_1 N^{-1/2}$, where N is a selected whole number exceeding 1, $F_1 = 63.992420$ kHz is the basic frequency of vibrations with N=1, and the source of mechanical vibrations is represented by a rotor hydrodynamic source providing for supply of the hydrocarbon liquid being processed into the impeller cavity.

The installation for fractionation of hydrocarbon liquids by means of distillation contains the following units connected by pipelines: a feed pump, at least one rectifying column and a primary rotor hydrodynamic device for pretreatment of liquid. The device for liquid pretreatment is realized as a device for resonance excitation of liquid and is installed in series between the feed pump outlet and the rectifying column inlet.

Reasoning from the above-mentioned arguments, the task the invention in question is to solve is a 20 to 50% increase of the output of light oil products compared to technologies conventionally used for oil processing with predetermined characteristics of fractionation. The technical result, which may be achieved due to application of the invention, is a possibility of increasing the output of light oil products without raising energy costs of equipment used at the enterprise.

To achieve the stated result, the well-known method implying vibrational effect on hydrocarbon material, their thermal cracking and obtaining finished products from the vapor phase in the rectifying column acquires a new feature: the vibrational effect on the hydrocarbon material is produced through primary and principal applications of electromagnetic vibrations, where the primary application of electromagnetic vibration is carried out at the stage preceding its supply to thermal cracking, and the principal application of electromagnetic vibrations is fulfilled in the rectifying column, where the hydrocarbon material is affected at one of the basic frequencies subject to the following common relation:

$$F = (153511 + 562.311 \cdot T) \cdot 10^8, \text{Hz},$$

where: T is the temperature of hydrocarbon material (degrees);

562.311 is the universal constant characterizing the range of frequency variation of an atom of hydrogen on the electron shell, with the temperature varied by one degree, Hz/degree;

153511 is an operator obtained by multiplication of the universal constant by 273 degrees, Hz.

With this method being implemented, the primary effect may be applied both in the pipeline supplying hydrocarbon material to thermal cracking, and in the operating container or containers used for storage and/or supply of hydrocarbon material to thermal cracking.

To achieve the stated result, the well-known installation for fractionation of hydrocarbon material comprising an operating container or containers, heating furnaces, a source of primary excitation of hydrocarbon is material and a rectifying column acquires a new feature: the source of electromagnetic excitation is made in the form of an electromagnetic radiator, and the rectifying column is designed in such a way, which provides for resonant excitation and serves as the principal exciter of hydrocarbon material. Here, the source of primary excitation may be installed both on the operating container (containers), and on the pipeline upstream to the heating furnaces.

BRIEF DESCRIPTION OF THE DRAWING

In the drawing FIG. 1 is a block diagram illustrating the method of the invention.

DESCRIPTION OF THE PREFERRED EMBODIMENT

The possibility of achieving the stated result is determined by the following factors. It is known that a system may only be viable provided that the type of vibrations should be selected in such a way, which would not only prevent the system elements from hindering each other's operation, but also ensure the best possible assistance for the system functioning to be stable and efficient. As a rule, such systems operate in the self-vibrating mode: the vibrating system controls its being energy supplied "from outside", thus creating feedback. According to the principle making the basis of the invention, the method of affecting oil undergoing advanced processing implies using the rectifying column itself as a "generator"—exciter of oil, which allows for oil processing to be much more "advanced". A rectifying column may operate in the "generator" mode without additional external sub-excitation for at least two months, with no other exciting device having to be involved in the process. Process containers filled with stock-tank oil (stock-tank oil accumulators), from which stock oil is supplied to the column, are used as a means of feedback for creating the self-vibrating mode of the column operation, i.e. ensuring its autonomous operation in the "generator" mode.

Thus, as a result of primary effect on hydrocarbon material achieved by means of a source of electromagnetic vibrations at a predetermined frequency and subsequent influence produced upon the material by the rectifying column, which excites the material providing further thermal cracking and distillation, the method and installation of fractionation of hydrocarbon material, when applied for oil processing with predetermined characteristics of fractionation, provides for an increase of the light oil products output of up to 20 to 50%, compared to conventional technologies, without raising energy costs for equipment used at the enterprise.

The invention is illustrated with conventional diagrams, where presents a processing chain of oil processing line, where the main constituent elements of the line are designated with rectangles, and the pipelines connecting these elements are designated with arrows;

According to the claims of invention, the suggested method may be implemented in the following way. Primary excitation is applied by means of a circular magnetostrictive transducer (electromagnetic radiator) mounted either on operating container 1 (FIG. 1), or on the pipeline going out of the operating container. When affected through the radiolucent body of the pipe (or container), oil becomes excited. It has to be taken into account that oil leaves the stock container at a certain temperature (67° C.). Before entering the column, oil generally undergoes stepwise heating. In particular, while passing through heat exchanger 2, it becomes heated up to 90÷110° C., then, coming to furnaces 3 (as a rule there are two of them), it is gradually heated by the first furnace up to 225° C., and by the second furnace, up to 340° C., or up to the temperature corresponding to the temperature of the feed zone of column 4 (i.e. the temperature of oil fed to the column). The difference between the oil temperature in the column feed zone and the temperature in the primary excitation zone is equal to factor K, which, according to Wien's law, characterizes the increase of vibrations frequency in the principal excitation zone compared to the primary excitation zone. Thus, knowing the frequency and shape of vibrations of the source of primary excitation (determined by the source design, which is not a subject of the invention, and therefore not considered in the presented materials), the temperature of oil in the place of installation of the above source, and the temperature in the principal excitation zone (i.e. factor K), let us determine the frequency of vibrations in the principal excitation zone, as well as the wavelength in this zone, based on the known value of the column height. It has to be noted that, for matching parameters of vibrations in the zones of primary and principal excitation, it is sufficient to make relevant change in the oil temperature in the zone of the primary excitation zone, or in the column feed zone. Here, there is no need to change temperature in the column feed zone, as the process chain of any oil-processing enterprise always provides for possibility to choose the place for installation of the primary excitation source without introducing modifications in the technological process. Hence, determination of the place for installation of the primary excitation source based on the known temperature in this zone is the first (technological) condition required for ensuring possibility of the column excitation, i.e. its operation in the generator mode.

The second condition of ensuring such possibility is selection of the relevant frequency to affect oil, which is to be calculated by formula [I]. Selection of this frequency is determined by the necessity to ensure the column operation in the self-oscillating mode (i.e. without sources of additional excitation). This condition is met in case the column energy at the excitation frequency contributes to release of additional internal energy obtained in process of cavitation transformations in the molecules of the C—H compound. What is meanwhile going on in the column is decomposition of heavier molecules into lighter ones without additional heating of oil, due to the internal energy of decomposition. This mode ensures influence upon a fraction of oil with a relevant tapping temperature, while the particular value of the affecting frequency is determined by formula [I]. In particular, while planning increase of the output of light oil fractions, calculated value $F_{pe3}$ is determined with these fractions relevant tapping temperature taken into account.

Application of the offered method at oil-processing enterprises showed that six hours after beginning of operation of the primary excitation source the column operates in the generator mode, with the further process taking place with the disconnected source, due to internal energy of decomposition of heavy molecules into lighter ones.

The invention claimed is:

1. Method of fractionation of hydrocarbon material including oscillating influence on the hydrocarbon material, its thermal cracking and obtaining in the rectifying column from the vapor phase of finished products, where the oscillating influence on the hydrocarbon material is carried out by means of primary and principal influence through electromagnetic vibrations, where primary influence is provided prior to its feeding for thermal cracking, and the principal one is fulfilled in the rectifying column, by affecting the latter at one of the following basic frequencies subject to the following common relationship:

$$F = (153511 + 562.311 \cdot T) \cdot 10^8, \text{Hz},$$

where:
T is the temperature of hydrocarbon material (degrees);
562.311 is the universal constant characterizing the range of frequency variation of an atom of hydrogen on the electron shell, with the temperature varied by one degree, Hz/degree;
153511 is an operator obtained by multiplication of the universal constant by 273 degrees, Hz.

2. Method described in claim 1, where the primary influence is carried out in the pipeline supplying the hydrocarbon material for thermal cracking.

3. Method described in claim 1, where the primary influence is carried out in the operating container or containers used for storage and/or supply of the hydrocarbon material for thermal cracking.

* * * * *